(12) United States Patent
Chen

(10) Patent No.: US 6,299,464 B1
(45) Date of Patent: Oct. 9, 2001

(54) MULTIMONITOR NOTEBOOK

(75) Inventor: Ching-Chen Chen, Taipei (TW)

(73) Assignee: Rever Computer Inc., Taipei (TW)

( * ) Notice: Subject to any disclaimer, the term of this patent is extended or adjusted under 35 U.S.C. 154(b) by 0 days.

(21) Appl. No.: 09/586,769

(22) Filed: Jun. 5, 2000

(51) Int. Cl.$^7$ .................................................. H01R 13/60
(52) U.S. Cl. ............................................................. 439/131
(58) Field of Search .................................. 439/131, 164, 439/31, 341; 361/741, 391, 756, 802, 683, 725, 726, 684; 345/502, 1, 3, 501, 507–509, 512; 379/135, 113, 140, 112, 133, 139

(56) References Cited

U.S. PATENT DOCUMENTS

| | | | |
|---|---|---|---|
| 5,027,426 | * | 6/1991 | Chiocca, Jr. ............................. 445/74 |
| 5,146,490 | * | 9/1992 | Beckman ............................. 379/413 |
| 5,938,457 | * | 8/1999 | Oh et al. ............................. 439/131 |
| 5,949,437 | * | 9/1999 | Clark ............................. 345/502 |
| 6,093,038 | * | 7/2000 | Chen et al. ............................. 439/131 |

* cited by examiner

Primary Examiner—Brian Sircus
Assistant Examiner—J. F. Duverne
(74) Attorney, Agent, or Firm—Rabin & Berdo, P.C.

(57) ABSTRACT

A notebook with a multi-monitor includes a notebook and an external monitor. The device has an extra digital display interface port mounted on the notebook besides the original CRT port. The digital display interface port not only outputs video signals, but also applies a power supply for the external monitor. It also makes the above-mentioned notebook connect with another monitor by means of a cable between the digital display interface port and the external monitor. Therefore, the notebook possesses several monitors and keeps applications running simultaneously.

2 Claims, 5 Drawing Sheets

MULTIMONITOR NOTEBOOK

BACKGROUND OF THE INVENTION

The present invention relates to a notebook with a multi-monitor, especially to a notebook with at least one digital display interface port which not only outputs a video signal but also applies as a power supply for the external monitor.

The main reason of popularity of notebooks depends on the notebook's light and portable characteristics. But the single monitor makes the demonstration and communication with customers a little bit inconvenient when salesmen turn the monitor of the notebook toward the customer, after booting up the data, to introduce products in a business interview. Of course, the liquid crystal display projector can be used to magnify the contents on the monitor onto a screen in a seminar, but when there [are] is no such equipment or when there is a business meeting with only two or three people, the use of a liquid crystal display projector becomes unnecessary.

Although the CRT port of the notebook can be used to connect to another monitor, a set of power supply and cables is still needed to provide monitor power, and this brings some sort of inconvenience to users. Especially in the event of demonstration at a public spot, such kind of equipment is not always available.

SUMMARY OF THE INVENTION

Therefore, it is an object of the present invention to provide a multi-monitor notebook with at least two monitors for several persons to engage in business talks by sharing some computer data simultaneously.

According to the present invention, the multi-monitor notebook mainly comprises a notebook and an external monitor. Besides one CRT port, the above-mentioned notebook possesses another digital display interface port which can not only transmit video signals to external monitors but also functions as a power supply for them. The present invention with external display port can connect several other liquid crystal display (LCD) monitors by plug in digital display interface port with only one cable to attain the aim of running programs on multiple monitors.

The external monitor of the present invention includes an LCD module and a protecting cover. The LCD module comprises front and rear shells and an LCD panel while the protecting cover is fastened at the upper or lower edge of the LCD module by a hinge. Under this configuration, the cover is adjustable in range from 0° to 360° in order to make the cover and LCD module shape in an "reverse-V" type or "L" type so that the external monitor can stand firmly on the desk and the view angle is easy to adjust. And then, when the device is not used, the protecting cover is folded back to veil the screen of the LCD module for preventing the monitor from being scratched and bumped.

In accordance with the foregoing configuration of the present invention, the present invention can be easily connected to external monitors for a few people to view the same computer data simultaneously, which makes sales by persons making brief reports more convenient. And the folding characteristic of external LCD makes the carrying and custody of the device more convenient.

BRIEF DESCRIPTION OF THE DRAWINGS

For a better understanding of the invention, reference will now be made by way of example to the accompanying drawings in which.

DETAILED DESCRIPTION OF THE PREFERRED EMBODIMENTS

Figure 1:
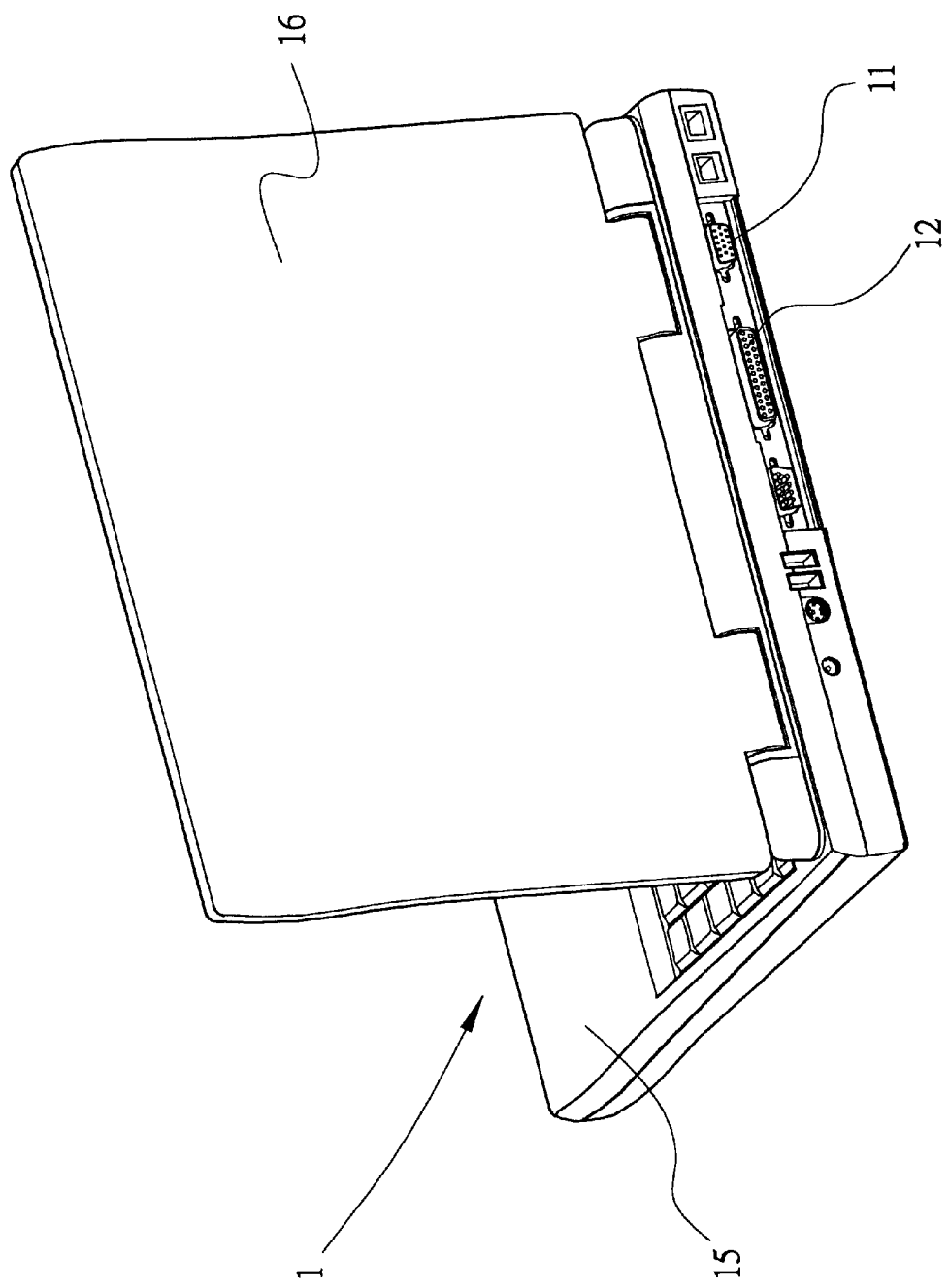
FIG. 1 shows a rear elevation of a notebook of the present invention.
Figure 2:
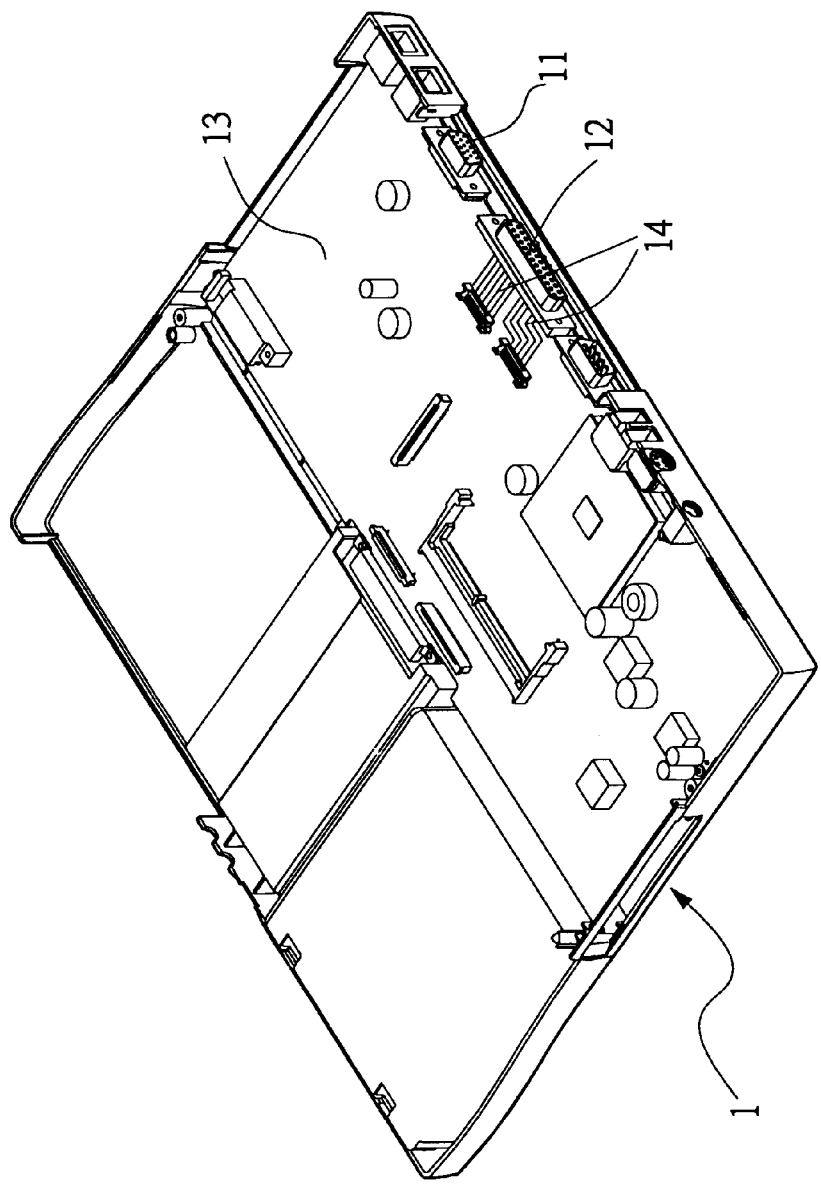
FIG. 2 shows a schematic view of the bottom of the shell and motherboard of the notebook of the present invention.
Figure 3:
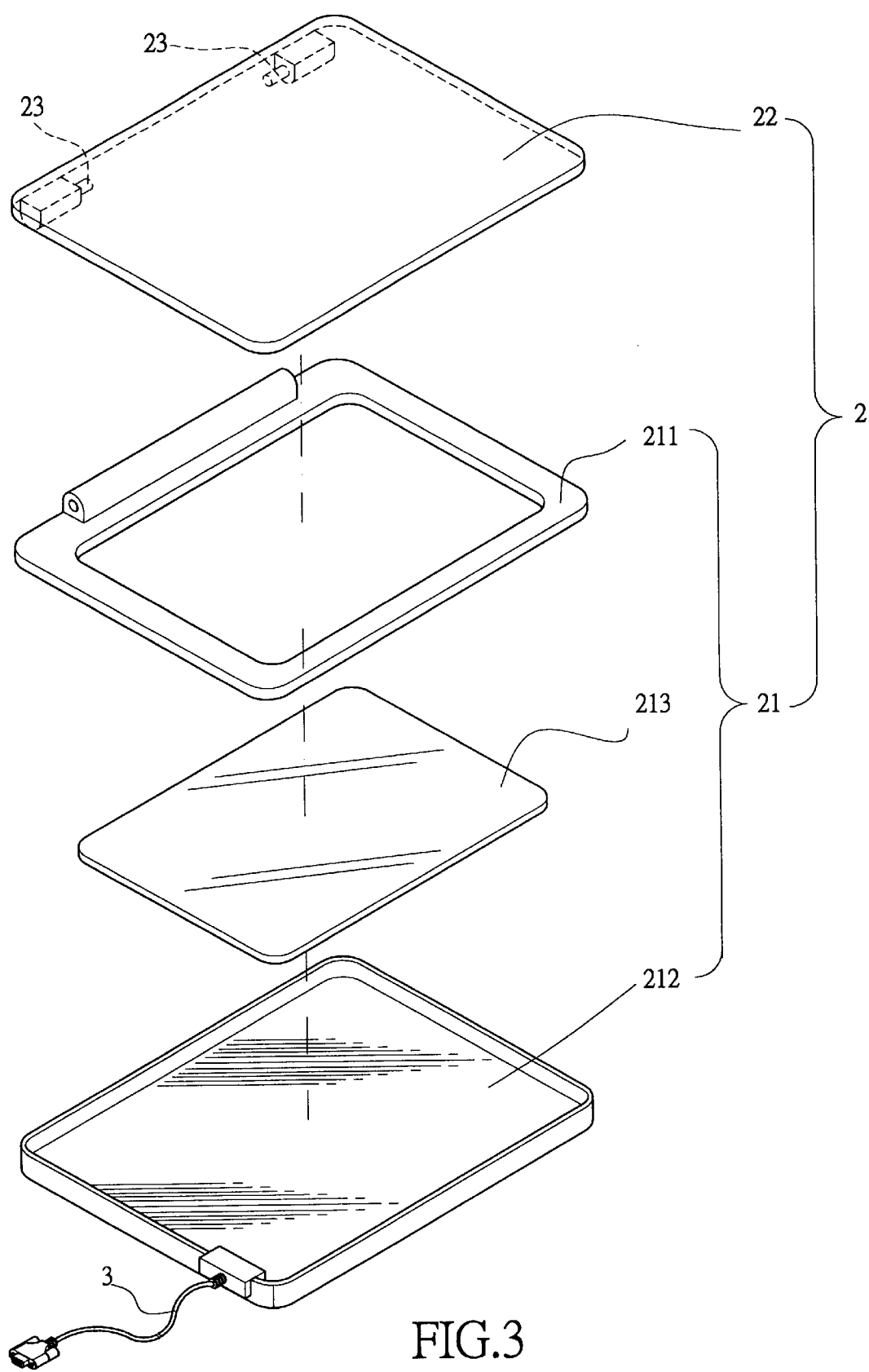
FIG. 3 is an exploded view of an embodiment of the external monitor of the present invention.

Referring to FIG. 1 to FIG.3, the present invention mainly comprises a notebook 1 and an external monitor 2. The notebook 1 includes a main body with a keyboard 15 and a fixed LCD monitor 16. The characteristic of the device is that the notebook 1 has another port—Digital Display Interface Port 12 which can not only transmit video signals to the monitor but also functions as a power supply for the external monitor—besides a CRT port 11. The Digital Display Interface Port 12 connects to the signal and power bus line 14 on the motherboard and extends to an interface port on the rear of the main body of the notebook.

The notebook 1 can be connected to an external monitor 2 (shown in FIG.3) easily by means of a cable 3 arranged between the Digital Display Interface Port 12 and the monitor 2. Therefore, the notebook 1 possesses several monitors and runs programs simultaneously without extra power supply equipment.

Figure 4:
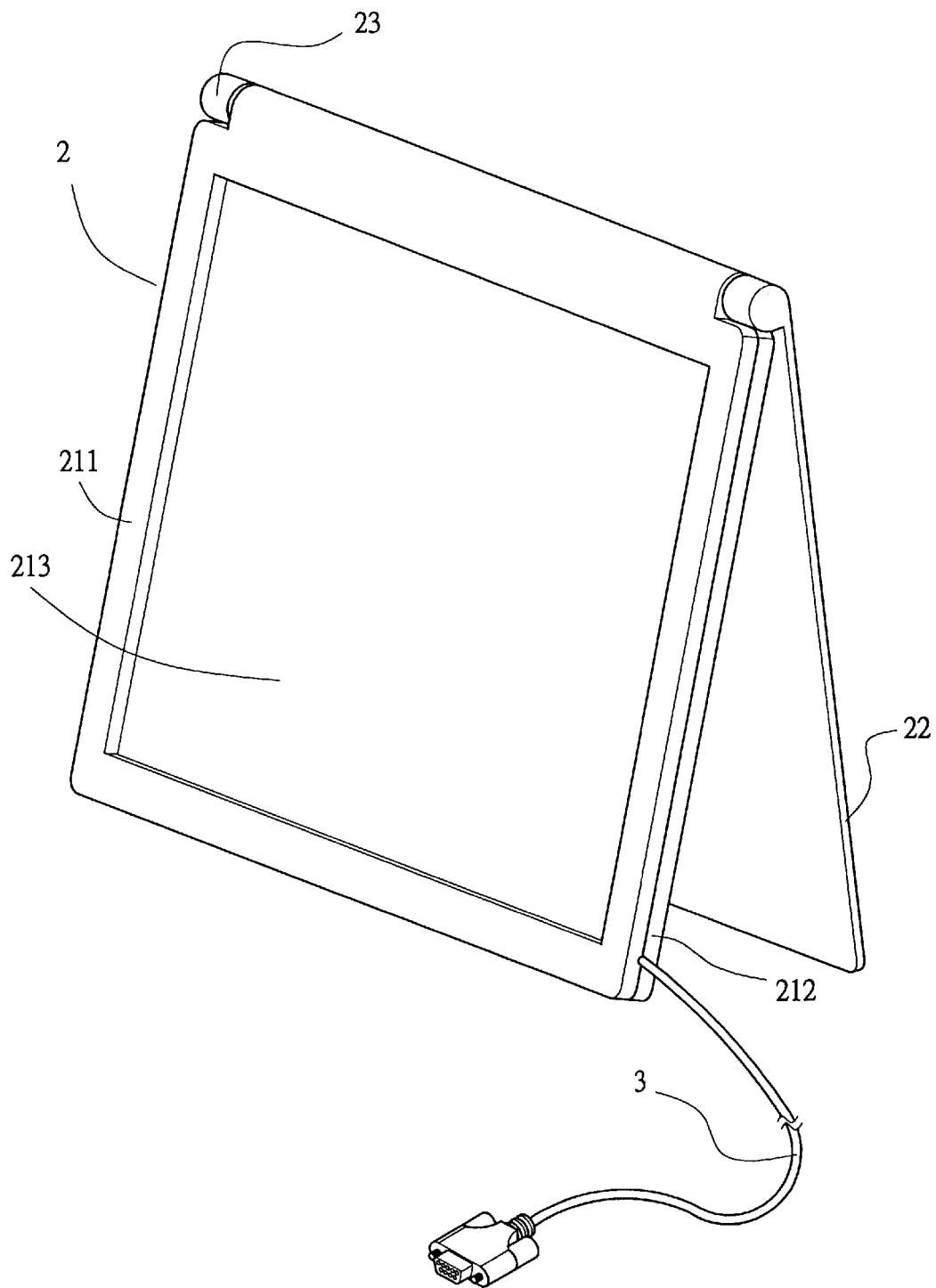
FIG. 4 is one embodiment of the external monitor of the present invention.
Figure 5:
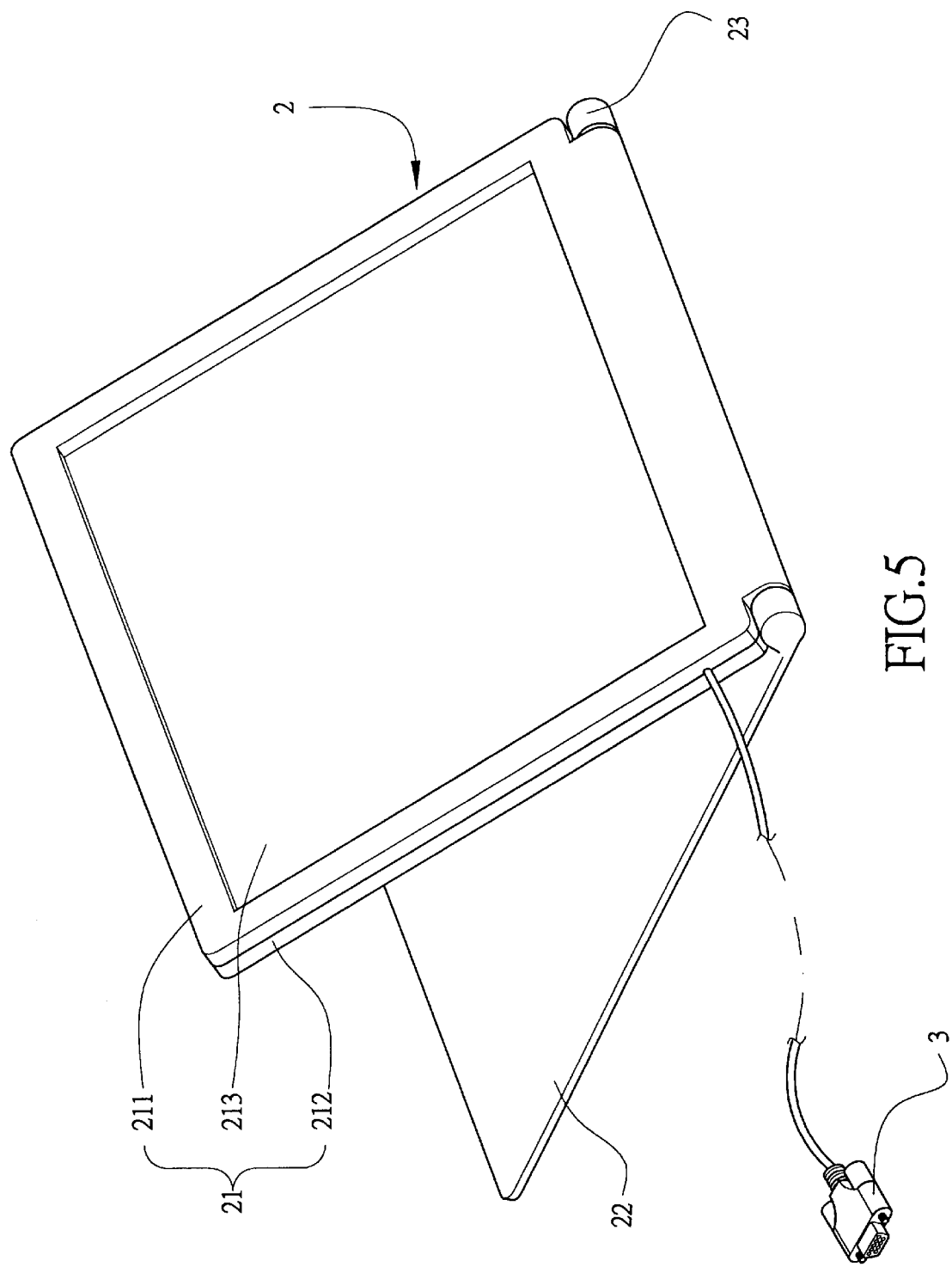
FIG. 5 is another embodiment of the external monitor of the present invention.

Referring to FIG.3, the external monitor 2 contains an LCD module 21 and a protecting cover 22, wherein the LCD module 21 includes an LCD panel 213 disposed between the front shell 211 and the rear shell 212. The protecting cover 22 is secured to the upper (or lower) edge of the LCD module 21 by a hinge 23. Under this configuration, when the external monitor 2 is being used, the protecting cover 22 can be adjusted by being unfolded to the back of the LCD module 21 with an angle therebetween ranging from 0° to 360° in order to make the cover 22 and LCD module 21 shape like an "reverse-V" type (as shown in FIG. 4) or "L"type ( as shown in FIG. 5). Therefore, the external LCD monitor 21 stands firmly on the desk and the view angle of the external LCD module 21 is also adjustable. And when the device is not in use, the protecting cover 22 is folded back to veil the screen of the external LCD module 21 in order to protect the surface of the LCD panel 213 from scratching and bumping.

According to the above structure of the present invention, salesmen can carry the caption notebook 1 with the external LCD 2 to convene a sales call and demonstrate to the clients by using a multi-monitor system in the best comfortable view angle while sharing and communicating opinions based on the same computer data. When the external LCD monitor 2 is not in use, the cable 3 can be plugged out from the notebook 1 and then the external LCD monitor 2 is folded and packed with the cable 3 on the top of the notebook 1 for easy custody and carry-out.

What is claimed is:

1. A multi-monitor notebook comprising a notebook and an external monitor, characterized in that at least one digital display interface port is added to said notebook, wherein said digital display interface port not only transmits video signals to said external monitor but also supplies power to said external monitor;

said notebook is connected to said external monitor by means of a cable so that programs running on said notebook are displayed simultaneously on at least two monitors, wherein said external monitor comprises an external liquid crystal display (LCD) module and a protecting cover; said LCD module having an LCD panel, a rear shell and a front shell while said LCD panel is disposed between said rear and front shells; said protecting cover is adjustable in a range from 0° to 360° and is mounted on said LCD module by a hinge; said protecting cover is turned to the back of said LCD module in order to make the side view of said external monitor be a "reverse-V" or "L" shape so that said external monitor stands firmly on a desk and the view angle of said LCD module is easy to adjust when said external monitor is used; while said external monitor is not in use, said protecting cover is folded back to cover said LCD module.

2. A multi notebook, comprising:

an external monitor, including:

an LCD module including an LCD panel, a rear shell and a front shell, said LCD panel being disposed between said rear and front shells; and a protecting cover that is adjustable in a range between about 0° to about 360° and being mounted on said LCD module by a hinge, said protecting cover being turnable to a back of said LCD module in order to make a side view of said external monitor be a "reverse-V" or "L" shape so that said external monitor will stand firmly on a desk and a view angle of said LCD module will be easy to adjust when said external monitor is used, wherein when said external monitor is not in use, said protecting cover is folded back to cover said LCD module; and a notebook having a fixed monitor and at least one digital display interface port that transmits video signals to said external monitor and supplies power to said external monitor, said notebook being connectable to said external monitor using a cable so that programs running on said notebook are displayed simultaneously on at least said external monitor and said fixed monitor.

* * * * *